Jan. 9, 1934.  H. E. CRINER  1,942,955
BREAD SLICING MACHINE
Filed Dec. 10, 1930  3 Sheets-Sheet 1
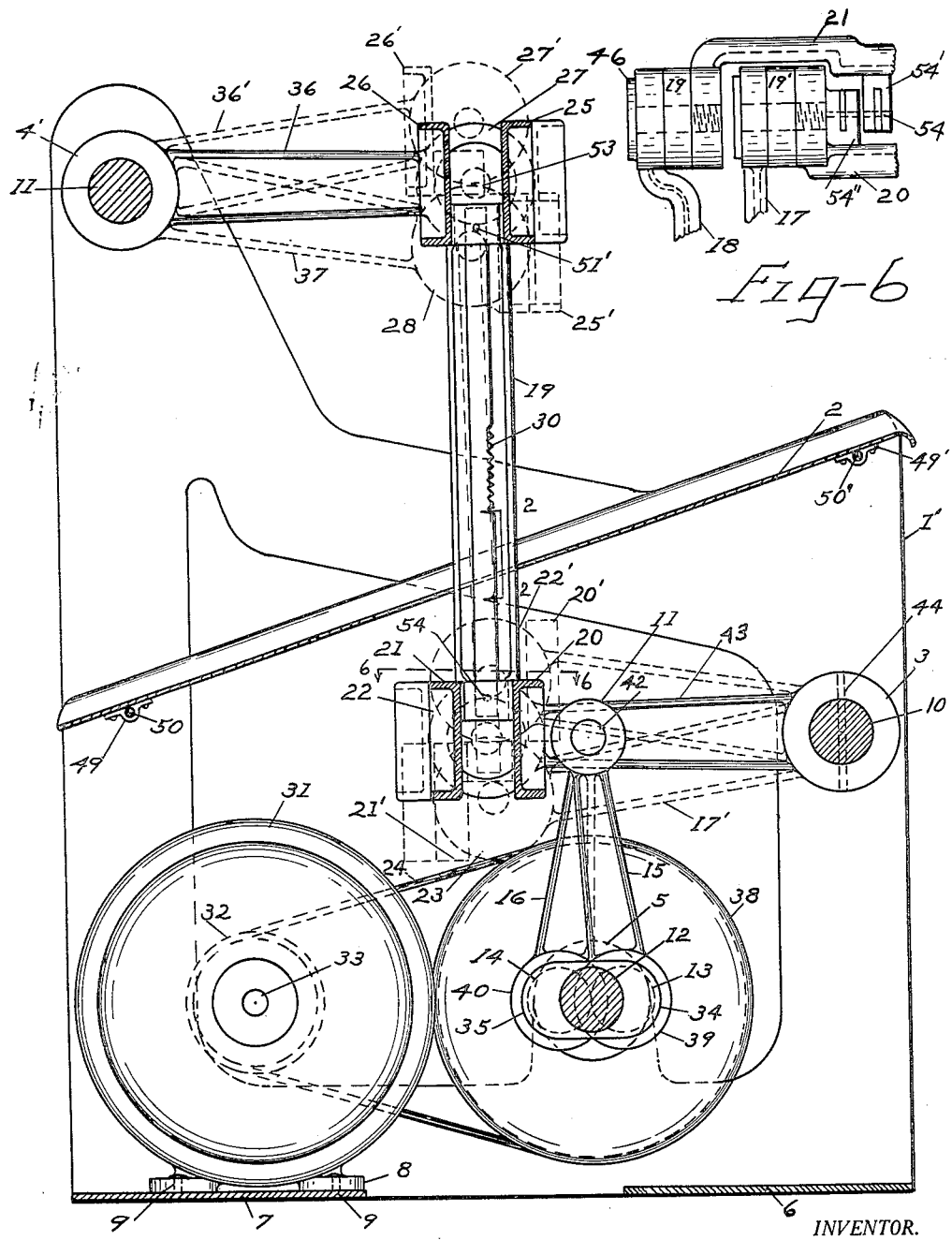
INVENTOR.
Harry E. Criner

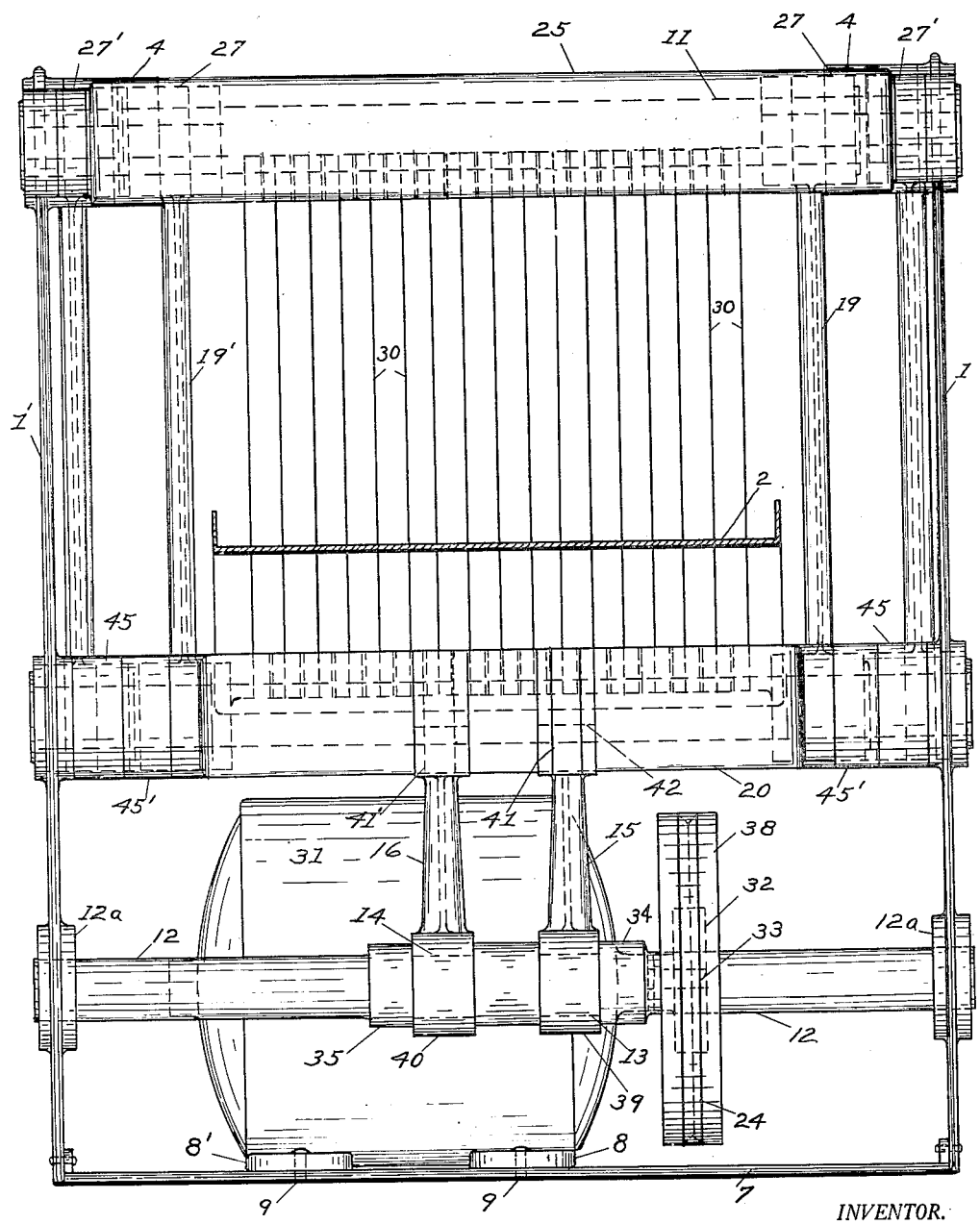

Jan. 9, 1934.  H. E. CRINER  1,942,955
BREAD SLICING MACHINE
Filed Dec. 10, 1930   3 Sheets-Sheet 3
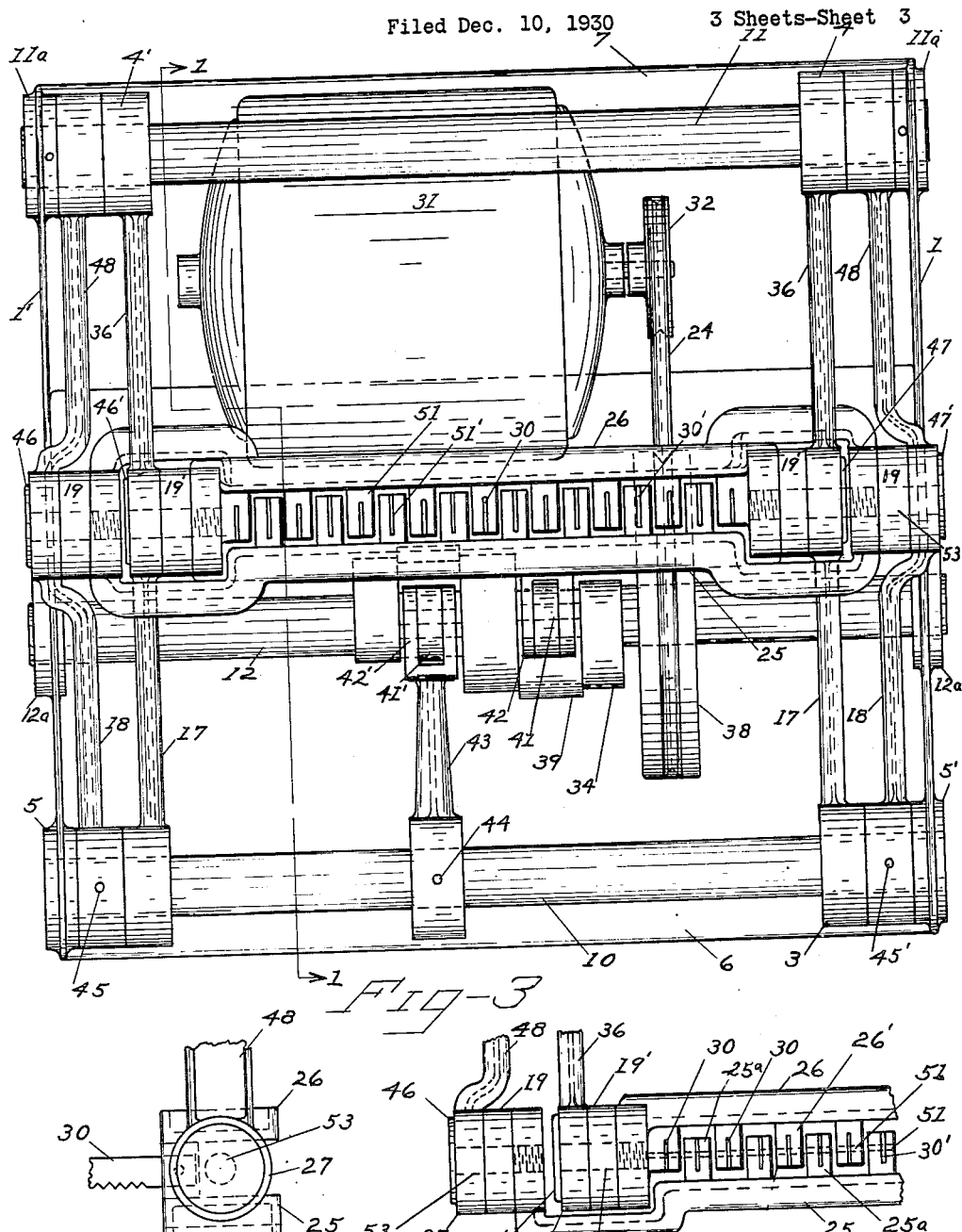
INVENTOR.
Harry E. Criner Patented Jan. 9, 1934

1,942,955

UNITED STATES PATENT OFFICE 1,942,955

BREAD SLICING MACHINE

Harry E. Criner, Davenport, Iowa, assignor, by direct and mesne assignments, to The Micro Corporation, Bettendorf, Iowa, a corporation of Delaware Application December 10, 1930
Serial No. 501,296

8 Claims. (Cl. 146—153)

My invention relates to improvements in bread slicing machines in which a plurality of reciprocating blades arranged in sets which move alternately in opposite directions, are utilized as the slicing elements.

The objects of my invention are:
1. To provide a form of bread slicing machine which will reduce vibration of the reciprocating parts and which will cause the opposite ends of the blades to travel in opposite curved arcs at the same time that they reciprocate longitudinally;
2. To provide simplified and improved driving means for blades so arranged;
3. To provide a bread slicing machine of improved efficiency and simplicity.

I attain these objects by the means illustrated in the accompanying drawings, in which,—

Figure 1 is a vertical section of my machine on the line 1—1 of Figure 3;

Figure 2 is a front elevation of my machine, but showing the breadboard in section on the line 2—2 of Figure 1 instead of in full;

Figure 3 is a top or plan view of my machine;

Figure 4 is a detail side view of the portion of the upper part of my machine a plan view of which is shown in Figure 5;

Figure 5 is a detail view of a part of the top of my machine;

Figure 6 is a detail of a part of my machine on the line 6—6 of Figure 1.

Similar numerals refer to similar parts throughout the several views.

My machine comprises side frames, 1 and 1', united by base plates, 6 and 7, and also by shafts, 10, 11 and 12. The shaft, 10, is mounted in suitable bosses, 5 and 5', formed integral with the side frames and the shaft, 11, is likewise mounted in bosses, 11a, formed integral with the side frames. The shaft, 12, is a crank shaft, the ends of which are mounted in suitable bosses, 12a, formed integral with the side frames.

Tie-rods or braces, 50 and 50', also unite the side frames and form supports for an inclined breadboard or table, 2, to which they are secured by clips, 49 and 49', fastened by bolts or rivets to the breadboard. The breadboard is considerably higher at the front of the machine or the right of it, as shown in Figure 1, than at the rear or left so that gravity will act or assist in carrying the bread to and through the slicing blades.

A motor, 31, is secured to the base by bolts, 9, and the motor shaft, 33, carries a belt pulley, 32, which drives a belt, 24, which passes around a larger pulley, 38, mounted upon the crank shaft, 12.

The crank shaft, 12, has a pair of cranks, 13 and 14, formed integral therewith, with connecting-rods, 15 and 16, mounted thereon. The cranks, 13 and 14, extend in diametrically opposite directions from the crank shaft, so that the connecting-rods, 15 and 16, are reciprocated vertically alternately, but in opposite directions, the connecting-rod, 15, moving downwardly while the connecting-rod, 16, is moving upwardly.

The connecting-rod, 16, has its upper end, 41', pivotally connected to a fork, 42', formed upon the rear end of the arm, 43, the opposite end of which is secured to the shaft, 10, by a pin, 44, or other suitable means, and as the arm, 43, moves up and down, it rocks the shaft, 10. The connecting rod, 15, has its upper end, 41, pivotally united to the fork, 42, which is formed integral with a crosshead, 20. The crosshead, 20, has its outer ends pivotally mounted in the inner ends of arms, 17, the outer ends of which are revolvably mounted upon the shaft, 10, adjacent the arms, 18, and are freely movable thereon. The arms, 17, serve to guide and stabilize the crosshead, 20, as it is reciprocated vertically by the connecting rod, 15.

The ends of the shaft, 10, have secured thereto corresponding driving arms, 18, which are pivotally united to a crosshead, 21. The crosshead, 21, extends transversely across the machine. It has formed integral therewith a series of lugs, 54', in which the lower end of one series of the saws, 30, is secured by pins, 54. An additional crosshead, 20, is pivotally united to rocker arms, 17, the outer ends of which are revolvably mounted upon the shaft, 10, and the crosshead, 20, has a lug or boss, 42, formed integral therewith and pivotally united to the upper end, 41, of the link, 15.

The crosshead, 20, has formed integral therewith, the lugs, 54'', in which the lower end of one of the series of saws, 30', are pivotally secured by pins, 54.

Upon the shaft, 11, I mount a pair of rocker arms, 48, the free ends of which are connected by pivots, 53, with links, 19, the lower ends of which links, 19, are pivotally connected to the crosshead, 21, so as to move therewith and the pivots, 53, have rigidly secured to the inner ends thereof, by threading or other suitable means, a crosshead, 25, which has lugs, 25a, united thereto in which the upper ends of the saws, 30', are secured by pins, 51.

Rocker arms, 36, have one end revolvably mounted upon the shaft, 11, intermediate the rocker arms, 48, and the rocker arms, 36, are connected by pivots, 53', with the upper end of links, 19', the lower ends of which links are pivotally united to the crosshead, 20, and move therewith.

To the pivots, 53' I rigidly unite an additional crosshead, 26, which has lugs, 26', formed integral therewith in which the upper ends of saws, 30, are secured by pins, 51'.

The upper crosshead, 25, is longer than the upper crosshead, 26, and for convenience, I refer to the crosshead, 25, as the outer crosshead and the crosshead, 26, as the inner crosshead, as the inner crosshead is contained between the ends of the outer crosshead, which are turned at right angles to connect to the pivots, 53. The ends of the inner crosshead, 26, are also bent at right angles to connect with the pivots, 53'.

The lugs, 26', upon the crosshead, 26, and the lugs, 25a, upon the crosshead, 25, are so proportioned and arranged that the pivot pins securing the ends of the saws therein, extend in line transversely of the lugs so that the upper ends of the cutting blades are all centered alike. The lugs upon the lower crossheads are correspondingly arranged. The lower crossheads are similar to the upper crossheads but are in reversed position, the outer one of the lower crossheads being alined with the inner upper crosshead and the inner lower crosshead being alined with the outer upper crosshead.

The lower ends of all the slicing blades being pivoted in a given line at a given distance from the center of the shaft, 10, will move in corresponding arcs and the pivots of the upper ends of the saw blades being arranged in a given line, the upper ends of all the saw blades will move in corresponding arcs, but the upper arcs will be oppositely curved from the lower arcs on account of the relative positions of the shafts, 11 and 10, although the arcs will be of the same length and are preferably of equal curvature, the curvature being determined by the length of the rocker-arms and driving arms.

In the operation of my machine, the bread is placed upon the board or table, 2, and fed manually and by gravity downwardly to the cutting blades, 30 and 30'.

The cutting blades are reciprocated vertically by the crossheads and at the same time the ends have an arcuate travel which assists and speeds up the cutting of the bread.

After the bread leaves the slicing blades, it may be removed from the table, 2, manually or mechanically as desired.

I prefer to form the crossheads, rocker-arms and other moving parts, so far as practicable, of aluminum or other very light metal so as to reduce the weight as much as possible and correspondingly limit vibration.

It is obvious that my mounting of the rocker-arms will cause the upper and lower ends of the blades to have a limited amount of forward and back movement with each stroke. The blades are preferably arranged so that they will stand vertically at the middle of their stroke and at the extreme upper and lower ends of the stroke, the lower ends of the blades will be a little forward of the middle position and the upper ends of the blades will be a little to the rear of the middle position.

The method of driving the outer lower crosshead through the shaft, 10, will tend to reduce the vibration thereof and the relatively opposed movement of the respective pairs of crossheads will also tend to reduce vibration.

I do not limit my claims to the precise forms of crossheads and rocker-arms shown, for these may be varied to a large extent without departing from the spirit of my invention.

I claim:

1. A bread slicing machine comprising side frames suitably united, upper, lower and intermediate shaft bearings formed therein, a crank shaft revolvably mounted in the lower shaft bearings, rocker-shafts mounted in the upper and intermediate shaft bearings, a pair of outer rocker-arms united to the lower rocker-shaft at the ends thereof, an outer crosshead united to the free ends of said rocker-arms and extending transversely of the slicing machine, a driving arm having one end united to the lower rocker-shaft, a connecting rod having its lower end mounted upon the crank shaft and its upper end pivotally connected to the free end of the driving arm, an inner crosshead extending transversely across the slicing machine having a connecting rod bearing formed integral therewith, a connecting rod having its upper end pivotally secured in said connecting rod bearings and its lower end revolvably mounted upon the crank shaft, said connecting rods being mounted upon and driven by a pair of opposed cranks formed integral with said crank shaft, a pair of outer rocker-arms pivotally mounted on the upper rocker-shaft near the ends thereof, an outer crosshead extending transversely of the machine and having its ends pivotally united to the free ends of the last mentioned rocker-arms, a pair of inner rocker-arms each having one end pivotally mounted upon the upper rocker-shaft adjacent the outer rocker arms, an inner crosshead extending transversely of the machine and pivotally connected to the free ends of said inner rocker-arms, lugs formed upon the opposed faces of the crossheads and arranged in alternate pairs, each lug upon the lower inner crosshead and its corresponding lug upon the upper inner crosshead forming one pair and each lug upon the lower outer crosshead and its corresponding lug upon the upper outer crosshead forming a pair and said pairs being alternately spaced along the crossheads, a cutting blade pivotally mounted in each pair of lugs, said lugs and blades being of such length and so proportioned that they extend in a straight line transversely of the machine when standing at the middle point of their travel, links connecting the upper and lower outer crossheads and pivotally united to each of same, links connecting the upper and lower inner crossheads and pivotally united thereto, and means for driving the crankshaft.

2. A bread slicing machine comprising side frames suitably united, upper, lower and intermediate shaft bearings formed therein, a crank shaft revolvably mounted in the lower shaft bearings, rocker-shafts mounted in the upper and intermediate shaft bearings, a pair of outer rocker-arms united to the lower rocker-shaft at the ends thereof, an outer crosshead united to the free ends of said rocker-arms and extending transversely of the slicing machine, a driving arm having one end united to the lower rocker-shaft, a connecting rod having its lower end mounted upon the crank shaft and its upper end pivotally connected to the free end of the driving arm, an inner crosshead extending transversely across the slicing machine having a connecting rod bearing formed integral therewith, a connecting rod having its upper end pivotally secured in said connecting rod bearings and its lower end revolvably mounted upon the crank shaft, said connecting rods being mounted upon and driven by a pair of opposed cranks formed integral with said crank shaft, a pair of outer rocker-arms pivotally mounted on the upper rocker-shaft near the ends thereof, an outer crosshead extending transversely of the machine and having its ends pivotally united to the free ends of the last mentioned rocker-arms, a pair of inner rocker-arms each having one end pivotally mounted upon the upper rocker-shaft adjacent the outer rocker-arms, an inner crosshead extending transversely of the machine and pivotally connected to the free ends of said inner rocker-arms, lugs formed upon the opposed faces of the crossheads and arranged in alternate pairs, each lug upon the lower inner crosshead and its corresponding lug upon the upper inner crosshead forming one pair and each lug upon the lower outer crosshead and its corresponding lug upon the upper outer crosshead forming a pair and said pairs being alternately spaced along the crossheads, a cutting blade pivotally mounted in each pair of lugs, links connecting the upper and lower outer crossheads and pivotally united to each of same, links connecting the upper and lower inner crossheads and pivotally united thereto, and means for driving the crank shaft.

3. A bread slicing machine comprising side frames suitably united, an upper rocker-shaft mounted in the upper part of the frame at the rear of the machine, a lower rocker-shaft rotatably mounted in the frame near the front thereof, a pair of inner and a pair of outer rocker-arms pivotally mounted upon the upper rocker-shaft, inner and outer crossheads united to said pairs of arms respectively, a pair of inner and a pair of outer rocker-arms united to the lower rocker-shaft, inner and outer crossheads united to said respective pairs of arms, links connecting the inner upper crosshead and the inner lower crosshead, corresponding links connecting the upper outer crosshead and the lower outer crosshead, lugs formed upon the adjacent faces of the crossheads and spaced alternately thereon, said lugs being arranged in alternate pairs, each lug upon the inner upper crosshead having a corresponding lug upon the inner lower crosshead and each lug upon the outer upper crosshead having a corresponding lug upon the outer lower crosshead, cutting blades pivotally mounted in the corresponding lugs of each series, and means for reciprocating the rocker-arms.

4. A bread slicing machine comprising side frames suitably united, an upper rocker-shaft mounted in the upper part of the frame at one end of the machine, a lower rocker-shaft rotatably mounted in the frame near the opposite end thereof, a pair of inner and a pair of outer rocker-arms pivotally mounted upon the upper rocker-shaft, inner and outer crossheads united to said pairs of arms respectively, a pair of inner and a pair of outer rocker-arms united to the lower rocker-shaft, inner and outer crossheads united to said respective pairs of arms, links connecting the inner upper crosshead and the inner lower crosshead, corresponding links connecting the upper outer crosshead and the lower outer crosshead and means for reciprocating the rocker-arms.

5. A bread slicing machine comprising side frames suitably united, an upper rocker-shaft mounted in the upper part of the frame at one end of the machine, a lower rocker-shaft rotatably mounted in the frame near the opposite end thereof, a pair of inner and a pair of outer rocker-arms pivotally mounted upon the upper rocker-shaft, inner and outer crossheads united to said pairs of arms respectively, a pair of inner and a pair of outer rocker-arms united to the lower rocker-shaft, inner and outer crossheads united to said respective pairs of arms, links connecting the inner upper crosshead and the inner lower crosshead, corresponding links connecting the upper outer crosshead and the lower outer crosshead, lugs formed upon the adjacent faces of the crossheads and spaced alternately thereon, said lugs being arranged in alternate pairs, each lug upon the inner upper crosshead having a corresponding lug upon the inner lower crosshead and each lug upon the outer upper crosshead having a corresponding lug upon the outer lower crosshead, cutting blades pivotally mounted in the corresponding lugs of each series, and means for reciprocating the rocker-arms.

6. In a bread slicing machine, the combination with a frame, of upper and lower rocker-shafts mounted therein, a pair of upper crossheads, pivoted pairs of rocker-arms uniting the upper crossheads respectively to the upper rocker-shaft, a pair of lower crossheads, pairs of rocker-arms uniting the lower crossheads to the lower rocker-shaft, one of said pairs of rocker-arms being rigidly united to said rocker-shaft and the other pair of rocker-arms being pivoted upon said rocker-shaft, cutting blades mounted upon the crossheads in series, one series connecting one upper crosshead and its complementary lower crosshead and the other series connecting the other crossheads, and means for reciprocating the crossheads vertically.

7. In a bread slicing machine, the combination with a frame, of upper and lower rocker-shafts mounted therein, a pair of upper crossheads, pivoted pairs of rocker-arms uniting the upper crossheads respectively to the upper rocker-shaft, a pair of lower crossheads, pairs of rocker-arms uniting the lower crossheads to the lower rocker-shaft, one of said pairs of rocker arms being rigidly united to said rocker-shaft and the other pair of rocker-arms being pivoted upon said rocker-shaft, links connecting the crossheads in vertical pairs, cutting blades mounted upon the crossheads in series, one series connecting one upper crosshead and its complementary lower crosshead and the other series connecting the other crossheads, and means for reciprocating the crossheads vertically.

8. In a bread slicing machine, the combination with a frame of two pairs of crossheads transversely secured therein, each pair constituting one upper and one lower crosshead, each pair being in substantially vertical alignment, a series of blades pivotally mounted in each of the respective pairs of crossheads, means for simultaneously reciprocating the pairs of crossheads in alternation vertically and means for simultaneously oscillating the crossheads of at least one pair in oppositely facing arcuate paths.

HARRY E. CRINER.